US011609958B1

(12) United States Patent
Bourne et al.

(10) Patent No.: US 11,609,958 B1
(45) Date of Patent: Mar. 21, 2023

(54) SYSTEM AND METHOD FOR MANAGING LOG RECORDS OF ELEMENTS OF A DISTRIBUTED COMPUTING ENVIRONMENT

(71) Applicant: VCE Company, LLC, Richardson, TX (US)

(72) Inventors: Geoffrey D. Bourne, Allen, TX (US); Rajesh Nandyalam, Whitinsville, MA (US); Pallabi Parveen, Plano, TX (US)

(73) Assignee: EMC IP Holding Company LLC, Round Rock, TX (US)

( * ) Notice: Subject to any disclaimer, the term of this patent is extended or adjusted under 35 U.S.C. 154(b) by 530 days.

(21) Appl. No.: 14/802,645

(22) Filed: Jul. 17, 2015

(51) Int. Cl.
*G06F 16/93* (2019.01)
*G06F 16/951* (2019.01)
*G06F 3/0482* (2013.01)
*G06F 16/248* (2019.01)
*G06F 16/245* (2019.01)

(52) U.S. Cl.
CPC .......... *G06F 16/951* (2019.01); *G06F 3/0482* (2013.01); *G06F 16/245* (2019.01); *G06F 16/248* (2019.01); *G06F 16/93* (2019.01)

(58) Field of Classification Search
CPC ............. G06F 17/30864; G06F 3/0482; G06F 16/951; G06F 16/93; G06F 16/248; G06F 16/245
USPC .......................................................... 707/706
See application file for complete search history.

(56) References Cited

U.S. PATENT DOCUMENTS 7,313,728 B2 * 12/2007 Rhea .................. G06F 11/0727 714/25
7,769,722 B1 * 8/2010 Bergant .............. G06F 11/2097 707/681
7,895,223 B2 * 2/2011 Toebes ................. G06F 16/903 707/758
8,156,553 B1 * 4/2012 Church ................. G06Q 10/06 726/22
8,478,722 B2 * 7/2013 Lee ..................... G06F 16/1873 707/622
8,930,339 B2 * 1/2015 Song ..................... G06F 16/951 707/706
9,256,509 B1 * 2/2016 Rajagopal ............. G06F 11/008
9,805,105 B1 * 10/2017 Bono .................... G06F 16/178
2004/0003010 A1 * 1/2004 Akazawa ................ G06F 16/93
2007/0100980 A1 * 5/2007 Kataoka ................. H04L 41/00 709/223
2008/0162592 A1 * 7/2008 Huang .................... G06F 16/22
2008/0282150 A1 * 11/2008 Erwin .................. G06F 16/957 715/255

(Continued)

*Primary Examiner* — Ashish Thomas
*Assistant Examiner* — Nargis Sultana
(74) *Attorney, Agent, or Firm* — Polsinelli PC; Derek D. Donahoe

(57) ABSTRACT

A log management system includes a computing system that executes a set of instructions to receive one or more search terms from a database, and identify one or more element records that match the search terms. The element records are associated with the elements of a distributed computing environment. For each matched element record, the instructions obtain any of multiple log messages associated with the matched element record from a log message database, and facilitates the display of the one or more identified element records and their associated log messages on a display.

17 Claims, 9 Drawing Sheets

(56) References Cited

U.S. PATENT DOCUMENTS

2009/0064193 A1* 3/2009 Chijiiwa ............. H04L 41/0622 719/318
2009/0233622 A1* 9/2009 Johnson ................ H04W 4/029 455/456.3
2010/0011031 A1* 1/2010 Huang .................. G06F 21/552 707/E17.007
2010/0306249 A1* 12/2010 Hill ........................ G06Q 50/01 707/769
2010/0332216 A1* 12/2010 Williams ................ G06F 40/55 704/4
2011/0289072 A1* 11/2011 SiMa ...................... G06F 16/21 707/769
2012/0166879 A1* 6/2012 Watanabe ........... G06F 11/0751 714/37
2013/0024567 A1* 1/2013 Roxburgh ........... G06F 11/3006 709/224
2014/0068022 A1* 3/2014 Kshirsagar .......... H04L 41/0813 709/220
2014/0089354 A1* 3/2014 Gonsalves .......... G06F 16/2358 707/812
2014/0280197 A1* 9/2014 Gatto .................. G06F 11/3409 707/769
2015/0206099 A1* 7/2015 Bockx .................... G06Q 10/10 705/343
2015/0227598 A1* 8/2015 Hahn ...................... G06F 16/11 707/737
2015/0261968 A1* 9/2015 Polyachenko .......... G06F 3/167 715/773
2015/0280959 A1* 10/2015 Vincent ................. G06F 3/0622 709/203
2016/0004721 A1* 1/2016 Iyer ....................... G06F 16/184 707/649
2016/0179906 A1* 6/2016 Roustant ............. G06F 16/3334 707/728

* cited by examiner

SYSTEM AND METHOD FOR MANAGING LOG RECORDS OF ELEMENTS OF A DISTRIBUTED COMPUTING ENVIRONMENT

TECHNICAL FIELD

Aspects of the present disclosure relate to computing devices and, in particular, to a log management system and method for a distributed computing environment.

BACKGROUND

Computing environments used by enterprises, such as corporations and universities, are often provided by multiple computing devices that function in a collaborative manner to meet the computing resource needs of the enterprise. With the advent of such computing environments, often referred to as the "cloud," and increased needs for stable computing environments, distribute computing environments that may include virtual computing environments were introduced and that provide a standardized package of components combined into a single, optimized computing solution. These distributed computing environments typically offer a relatively high level of customization for applications by distributing the workload of applications over multiple resources while alleviating the need to manage specific physical requirements of the underlying physical structure on which the resources are executed.

SUMMARY

According to one aspect of the present disclosure, a log management system includes a computing system that executes a set of instructions to receive one or more search terms from a database, and identify one or more element records that match the search terms. The element records are associated with the elements of a distributed computing environment. For each matched element record, the instructions obtain any of multiple log messages associated with the matched element record from a log message database, and facilitates the display of the one or more identified element records and their associated log messages on a display.

BRIEF DESCRIPTION OF THE DRAWINGS

The various features and advantages of the technology of the present disclosure will be apparent from the following description of particular embodiments of those technologies, as illustrated in the accompanying drawings. Also, in the drawings the like reference characters may refer to the same parts throughout the different views. The drawings depict only typical embodiments of the present disclosure and, therefore, are not to be considered limiting in scope.

DETAILED DESCRIPTION

Figure 1A:
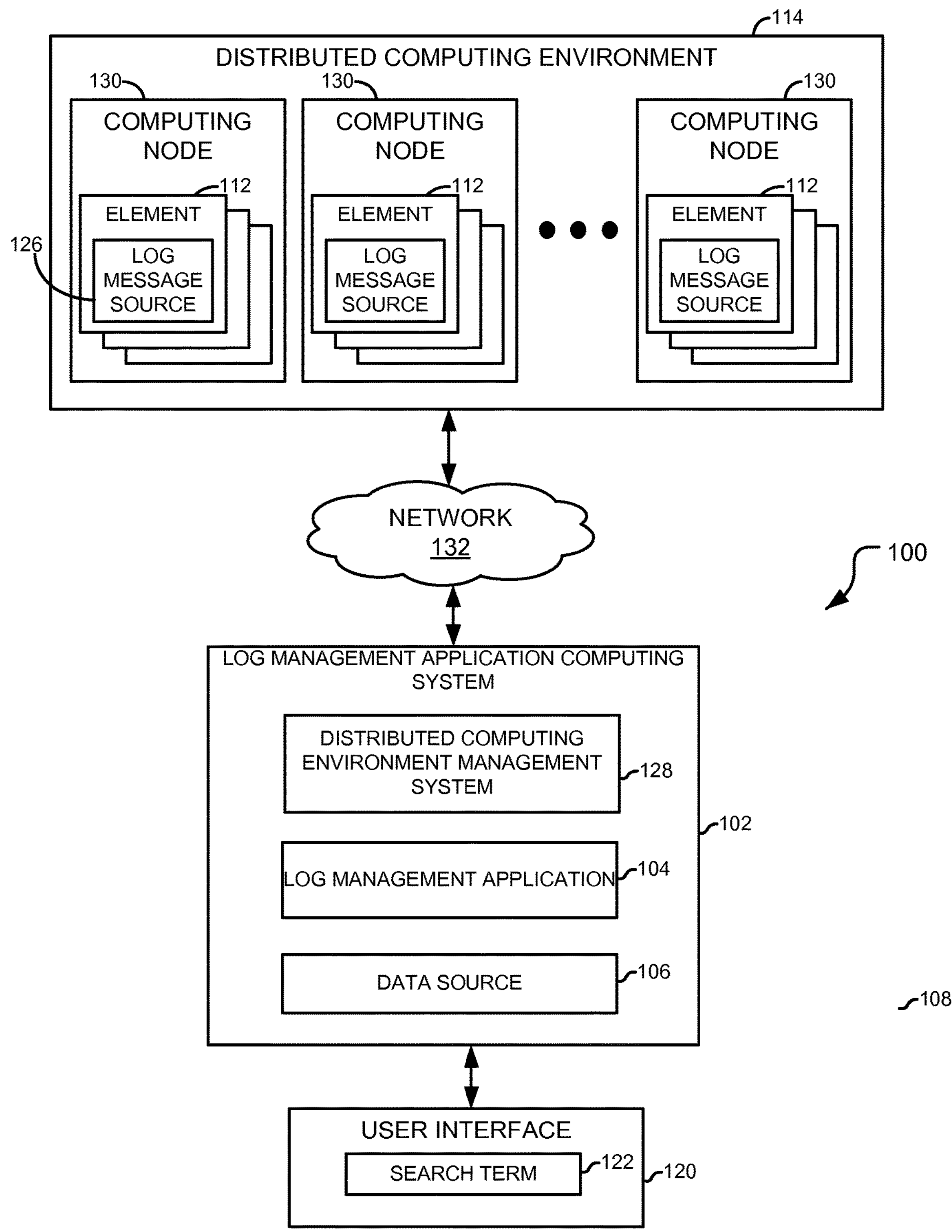
FIG. 1A illustrates an example log management system for a distributed computing environment according to one embodiment of the present disclosure.

Embodiments of the present disclosure provide a log management system for distributed computing environments that stores log records generated by the elements of a distributed computing environment, and provides a technique for associating the stored log records with element records stored in another database so that the log records may be searchable in a relatively easy and efficient manner. The ability to search through the log records of computer-based devices, such as the elements of a distributed computing environment, has remained an important tool that can be used for their analysis. Nevertheless, traditional techniques for searching through the log records generated by the elements of a distributed computing environment has heretofore remained a burdensome endeavor, due at least in part to the relatively high level of difficulty involved in isolating the log records of elements that may be germane to a particular grouping of elements from those of other elements that are not part of that group. Embodiments of the present disclosure provide a solution to this problem, among other problems, by using a log management system that associates the log records with the element records of a searchable database so that the log records associated with those elements may be obtained in an efficient manner.

Distributed computing environments have provided an efficient platform for the execution of relatively large and complex applications and services requiring a relatively high level of availability and performance. For example, an application may be deployed on a distributed computing environment by allocating multiple elements of the distributed computing environment to handle its workload without substantial regard to how those elements are managed and/or maintained. Additionally, the distributed computing environment may provide a relatively high level of availability for the deployed application by automatically migrating the use of certain elements to other elements when those certain elements fail. Nevertheless, this flexible deployment of elements often causes an undue burden for monitoring the performance of a particular application or group of applications. Due to the relatively large quantity of elements typically implemented in distributed computing environments, maintenance can be burdensome. For example, when troubleshooting or investigating a particular element or a group of elements in the distributed computing environment, it is often desired to positively identify the element(s) of concern and then observe any recent events that may have occurred on those element(s) using log messages generated by each element.

Prior techniques of addressing this problem have typically involved initially working from a collection of log records and then filtering or pruning those log records based on certain criteria to identify a particular element. Pre-correlation may be performed, but this technique may impose an unbounded, ingress-driven processing overhead. Thus, these prior techniques at log record analysis were often burdened with a relatively high degree of noise (e.g., looking for a needle in a haystack) when searching for symptoms of a problem or other maintenance issues that may exist in one or more elements of the distributed computing environment.

Figure 1B:
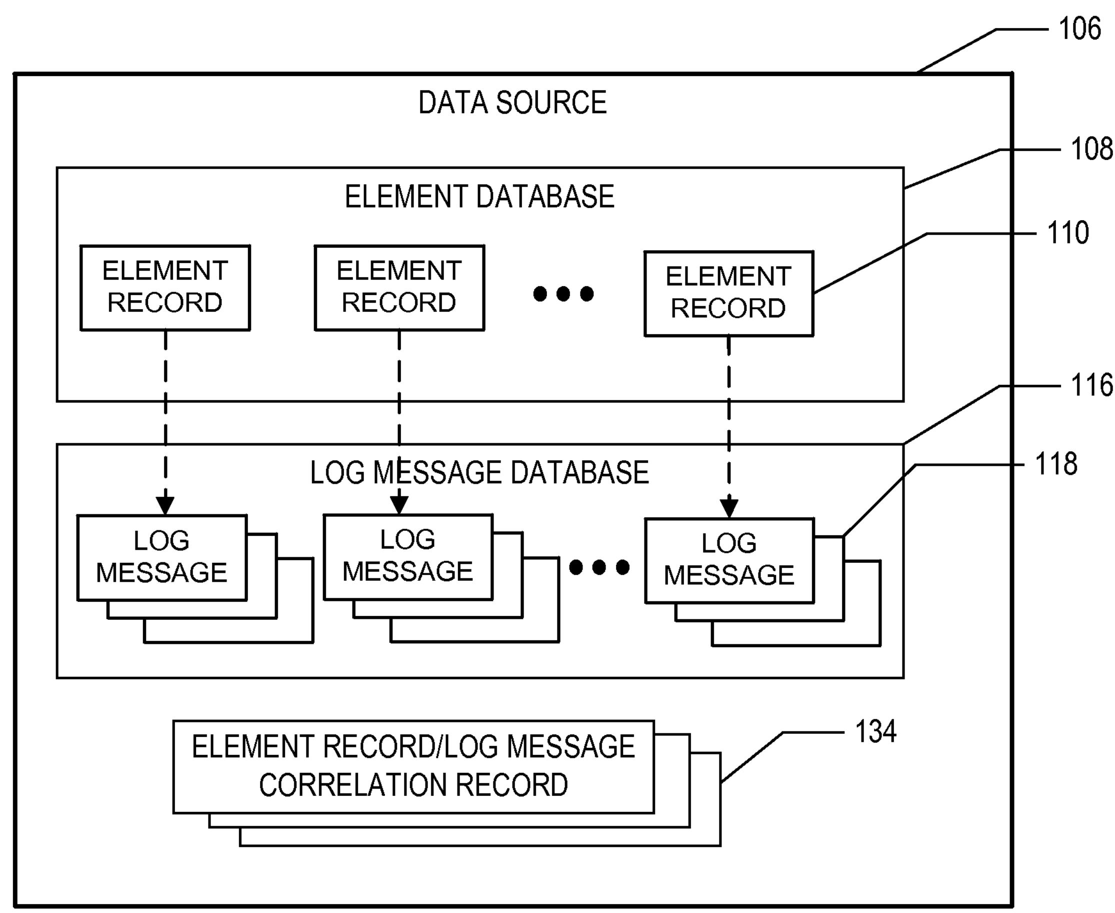
FIG. 1B illustrates an example data source that may be used with the log management system according to one embodiment of the present disclosure.

FIGS. 1A and 1B illustrate an example log management system 100 according to one embodiment of the present disclosure. The system 100 includes a log management application computing system 102 having a log management application 104 and a data source 106 that stores, among other things, an element database 108 including element records 110 associated with the elements 112 of a distributed computing environment 114, and a log message database 116 that stores log messages 118 associated with the elements 112 of the distributed computing environment 114. As will be described in detail herein below, the log management application 104 provides for access to the log messages 118 associated with a particular element 112 when its element record 110 is retrieved by a user interface 120 using one or more search terms 122.

In general, the application 104 utilizes the element database 108 to store element records 110 associated with the elements 112 in the distributed computing environment 114, and accesses those element records 110 according to one or more search terms 122 provided from a user to filter the element records 110 such that only those element records 110 of interest are returned to the user via the user interface 120. During retrieval of the desired element records 110, the application 104 associates those log messages 118 stored in the log message database 116 with the filtered element records 110 such that the log messages associated with a select group of element records 110 may be provided to the user. Although the present example log management system 100 as described herein utilizes a separate and distinct element database 108 and log message database 116 for storing the element records 110 and log messages 118, respectively, it should be understood that the element records 110 and their associated log messages 118 may be stored in the same database without departing from the spirit and scope of the present disclosure.

Embodiments of the present disclosure may have certain advantages not heretofore provided by conventional log message management and search systems for distributed computing environments 114. For example, embodiments may alleviate substantial noise that may be encountered by a relatively large quantity of log messages by starting from a known set or group of elements, which can then be correlated with a well bounded set of log messages targeted at those elements. Furthermore, starting with a known grouping of elements may be beneficial for analysis of the elements of a distributed computing environment given that many of its elements are inherently grouped according to a particular function, such as those elements allocated to a sub-system (e.g., compute sub-system, network sub-system, storage sub-system, etc.), those elements allocated to an array (e.g., a blade array, a storage array, etc.), or a group of element allocated to a particular user (e.g., a tenant) and/or an application executed on the group of elements.

In general, an element 112 of the distributed computing environment 114 refers to physical equipment, such as a disk drive, a computing blade, a power supply circuit, and the like, a software component, such as an operating system, a process or service executed on physical equipment, or any other system component that exhibits a non-deterministic change in behavior over time. Each element 112 has a log message source 126, or other mechanism, such as an operating system or other executable process, that generates log messages 118 when certain operational criteria are met. In some cases, the log message source 126 and the log messages 118 that it generates conform to a syslog standard. In general, event messages conforming to the syslog standard are textual, line oriented capture of an element's activity or events.

In one embodiment, the element database 108 and/or the log message database 116 comprises a NoSQL database in which records, commonly referred to as documents, may be generated and stored therein without the need for any specified schema. For example, the NoSQL database may be administered by a NoSQL search engine that generates a NoSQL document associated with each element 112 or log message 118, and provides for access to each document using standard search notation, such as with alpha-numeric search phrases and/or other criteria that may be used to access various forms of information about the documents stored in the database. In a particular example, the NoSQL database utilizes an Elasticsearch™ search engine, which is released under an open source license from the Apache Software Foundation in Forest Hill, Md.

The Elasticsearch™ search engine stores information about each element 112 and/or log message 118 as a Javascript object notation (JSON) document in the element database 108 and/or log message database 116 in a manner that does not require any particular schema. Thus, the schema of the newly added element record 110 and/or log message 118 does not need to be integrated with the schema of existing element records 110 and/or log messages 118 in the element database 108 and/or log message database 116, respectively. Additionally, the Elasticsearch™ search engine is a multi-tenant search engine having a RESTful interface for efficient operation across a network, such as a proprietary communication network of the distributed computing environment, or a publicly available network, such as the Internet.

The application 104 may communicate directly with the elements 112 in the distributed computing environment 114 to receive their information, or it may communicate with the elements 112 through an intermediary mechanism, such as a distributed computing environment management system 128. The distributed computing environment management system 128 may be any type, such as one that manages the operation of the elements 112 of the distributed computing environment 114, which may include, for example, provisioning elements, de-provisioning elements, configuring one or more operational parameters on each element 112, and the like. Any suitable type of distributed computing environment management system 128 may be implemented. In one embodiment, the distributed computing environment management system 128 includes a vSphere™ software suite that is available from VMware Corporation, which is headquartered in Palo Alto, Calif.

The elements 112 may be provided by one or more computing nodes 130 configured in the distributed computing environment 114. In most cases, the elements 112 generally refer to computing devices that perform some function for the overall operation of the distributed computing environment 114, while the nodes 130 generally refer to physically distinct structures (e.g., computing racks) that house the elements 112. Examples of such computing devices may include, for example, blade computing devices, laptop or notebook computers, workstations, tablet computers, and the like, while the computing nodes 130 may include complex computing structures, such as clusters, unified computing systems, fabric-based computing systems, and dynamic infrastructures. The computing nodes 130 may also include other communication devices, such as switches, routers, firewall appliances, or other communication device that facilitates communication among multiple other computing nodes 130. Each computing node 130 may also include a distributed computing system, such as one implemented with one or more storage arrays, network element, compute devices, and/or any combination thereof. For example, a computing node 130 may comprise one or more converged infrastructures configured in the distributed computing environment 114.

The log management application computing system 102 and the distributed computing environment 114 communicate with one another using a communications network 132. Nevertheless, the log management application computing system 102 and the distributed computing environment 114 may communicate with one another in any suitable manner. For example, the log management application computing system 102 and the distributed computing environment 114 may communicate with each other using wireless and/or wired communications. In one embodiment, the log management application computing system 102 and the distributed computing environment 114 communicates with one another using a communication network 132, such as the Internet, an intranet, or another wired and/or wireless communication network. In another embodiment, the log management application computing system 102 and the distributed computing environment 114 communicate with one another using any suitable protocol or messaging scheme. For example, they may communicate using a Hypertext Transfer Protocol (HTTP), extensible markup language (XML), extensible hypertext markup language (XHTML), or a Wireless Application Protocol (WAP) protocol. Other examples of communication protocols exist. For example, the log management application computing system 102 and the distributed computing environment 114 may communicate with one another without the use of a separate and a distinct network.

Figure 2A:
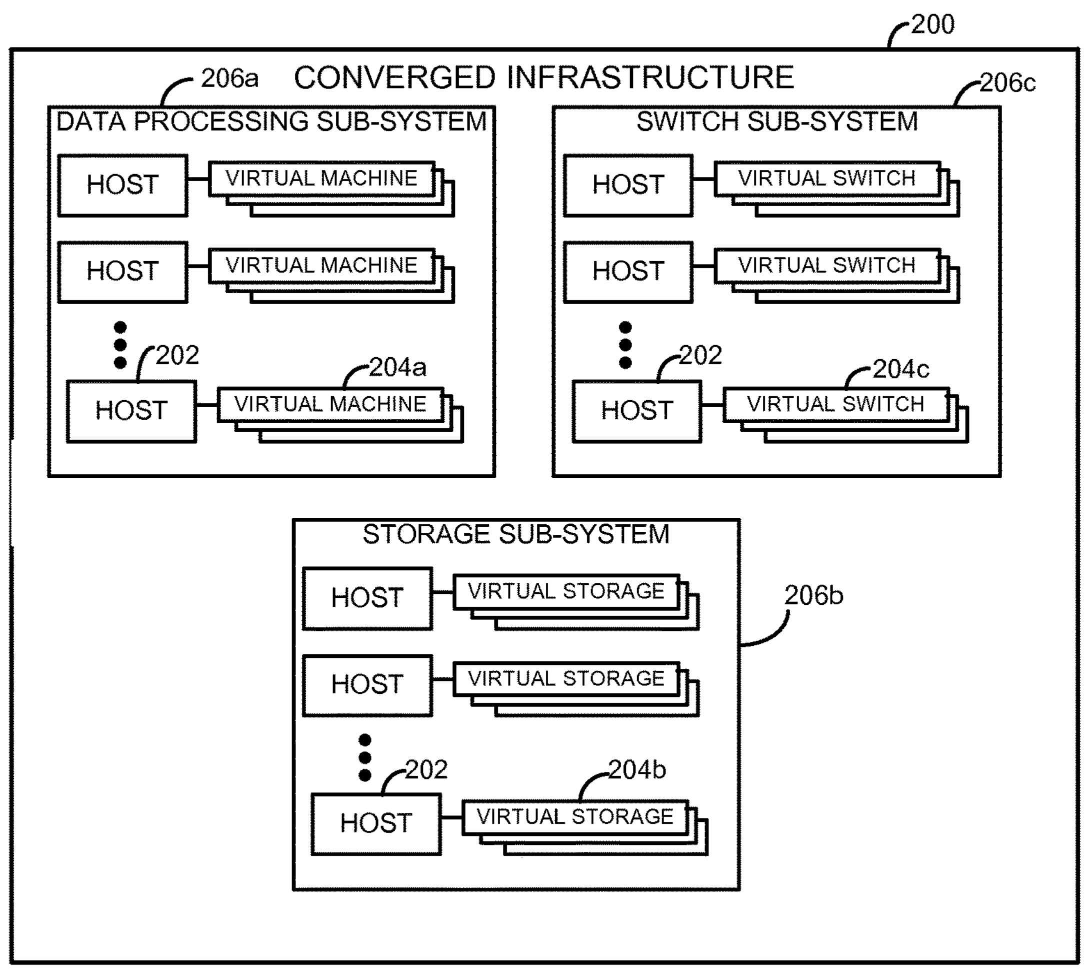
FIGS. 2A and 2B illustrate an example converged infrastructure that may be implemented as a computing node of the distributed computing environment according to one embodiment of the present disclosure.
Figure 2B:
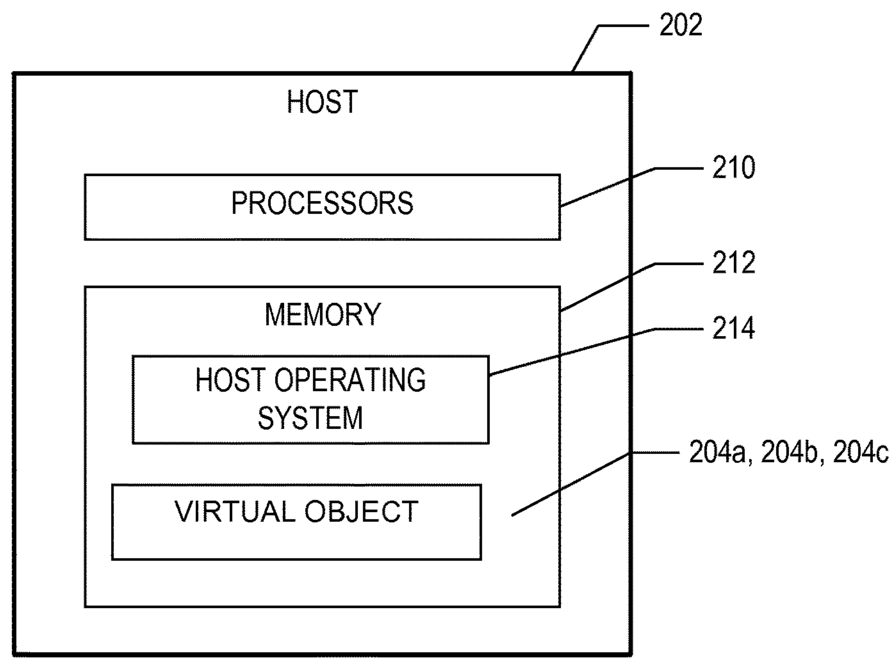

FIGS. 2A and 2B illustrate an example converged infrastructure 200 that may be implemented as a computing node 130 of the distributed computing environment 114 according to the teachings of the present disclosure. For example, multiple converged infrastructures 200 as described herein may be configured to communicate with one another using a communication network, such as the communication network 132 to form at least a portion of the distributed computing environment 114.

The converged infrastructure 200 may be any type having multiple hosts 202 that each executes one or more virtual objects (e.g., virtual machines 204*a*, virtual storage objects 204*b*, and virtual switch objects 204*c*). The hosts of a converged infrastructure are often referred to as compute servers. Nevertheless, in this disclosure, the term 'host' may be interpreted as any physical device and/or component that supports the operation of virtual elements 112 and services provided by those virtual elements. The particular converged infrastructure 200 as shown includes several sub-systems, such as a data processing sub-system 206*a*, a data storage sub-system 206*b*, and a switch sub-system 206*c*. Nevertheless, it should be understood that other converged infrastructures 200 may include additional, fewer, or different types of sub-systems without departing from the spirit and scope of the present disclosure.

In one aspect, each converged infrastructure 200 includes a combination of these sub-systems or other sub-systems that are packaged and interconnected in a standardized manner for ease of maintenance and use. Converged infrastructures such as these are often implemented in environments where relatively high reliability and/or availability are desired, such as in an enterprise environment. Nevertheless, it is contemplated that any converged infrastructure, such as a computer cluster, computing grid, blade array, and/or other converged infrastructure may be managed using the teachings of the present disclosure. For example, a converged infrastructure 200 such as that shown includes components found in Vblock™ System infrastructure packages available from VCE, LLC, which is located in Richardson, Tex.

In one aspect, the data storage sub-system 206*b* includes computer-readable memory structures for storing data used by the converged infrastructure 200, which may include network attached storage (NAS) arrays and/or storage area network (SAN) arrays that are facilitated by multiple virtual objects (e.g., virtual storage objects 204*b*). The switch sub-system 206*c* provides for communication among the various sub-systems of the converged infrastructure 200, and may include components, such as fabric interconnect systems, Ethernet switches/routers, multilayer director switches (MDSs), and the like. The data processing sub-system 206*a* executes applications that access, store, and otherwise manipulate data stored by the converged infrastructure 200. For a particular example, either of the data storage sub-system 206*b*, the switch sub-system 206*c*, and/or the data processing sub-system 206*a* may comprise a blade computing platform having multiple hosts (e.g., blade computing devices) 202 that each executes one or more virtual objects.

Each sub-system includes multiple hosts 202 that each executes one or more virtual objects, which in this particular example, are virtual machines (VMs) 204*a*, virtual storage objects 204*b*, and virtual switch objects 204*c*. For example, virtual objects, such as the VMs 204*a* may include software-based operating systems that are emulated on their respective hosts, which are physical computing devices. For each host, its respective VMs may be managed by a hypervisor that provides a virtual architecture for each VM's operation and controls various aspects of their operation. One example of a suitable hypervisor includes the VMware ESX™ software suite that is available from VMware corporation, which is located in Palo Alto, Calif.

FIG. 2B illustrates an example host 202 implemented on each converged infrastructure 200 according to one aspect of the log management system 100. The host 202 is a computing or processing device that includes one or more processors 210 and a memory 212. For example, the host 202 can be a personal computer, such as a laptop or notebook computer, a workstation, or other processing device such as a personal digital assistant or a tablet computer. In a particular embodiment, the host 202 is a rack mounted host, such as blade host in which multiple blade hosts share a common backplane for communication with one another and for receiving power from a rack mounted power distribution unit. The memory 212 stores a host operating system 214 and one or more virtual objects (e.g., VMs 204*a*, virtual storage objects 204*b*, and virtual switch objects 204*c*) that are executed by the processor 210. The host operating system 212 controls and manages the operation of the virtual objects executed on the host 202. For example, control signaling for starting, stopping, and/or changing operating parameters of each virtual object is managed through the host operating system 212.

Figure 3:
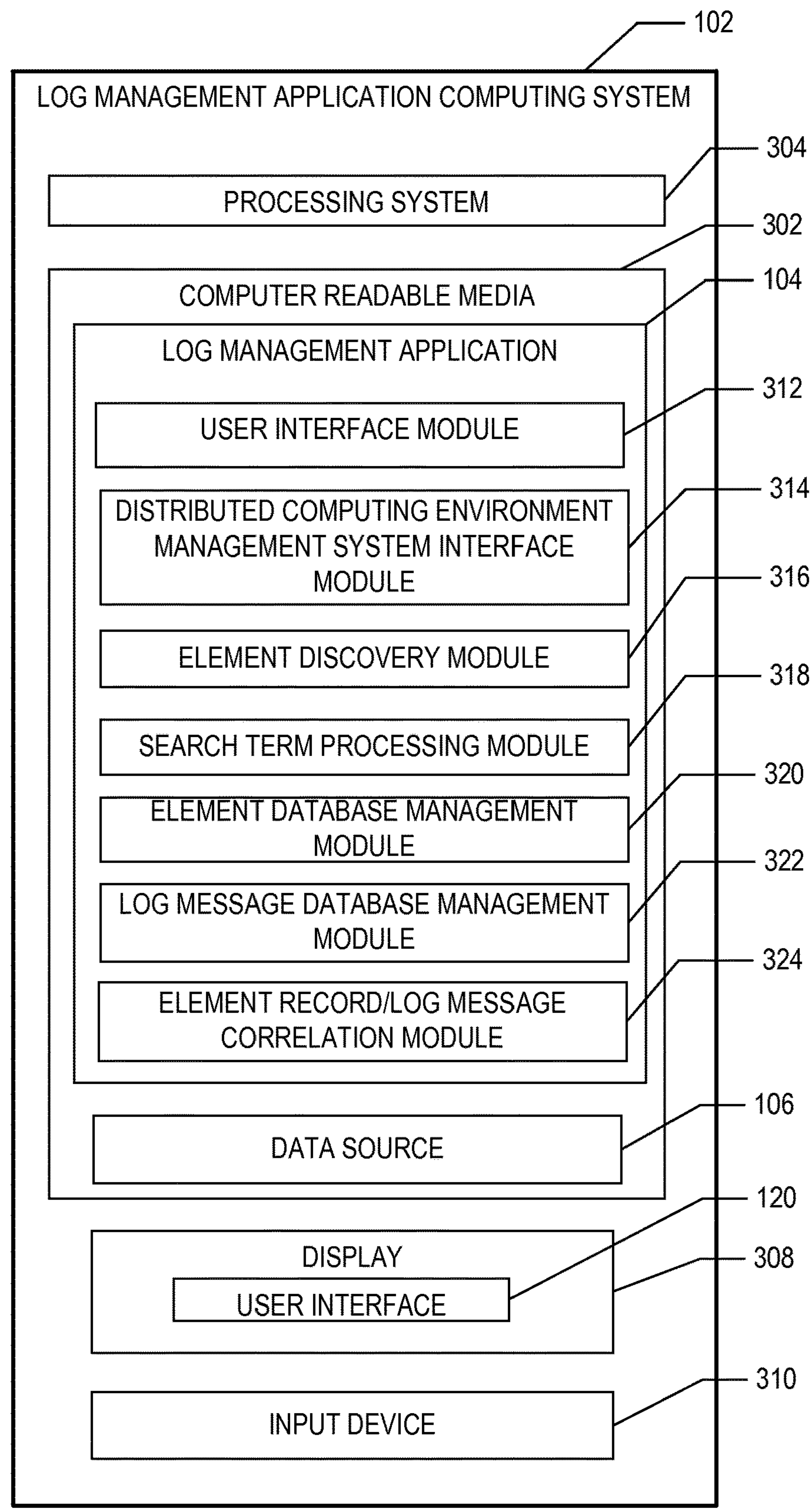
FIG. 3 illustrates a block diagram of an example log management application executed on the log management application computing system according to one embodiment of the present disclosure.

Referring now in more detail to FIG. 3, a block diagram of an example log management application 104 executed on the log management application computing system 102, is depicted according to one aspect of the present disclosure. The log management application 104 is stored in a computer readable media 302 and executed on a processing system 304 of the computing system 102. The processing system 304 is hardware. The computing system 102 may include any type of computing system, such as one or more management computing systems, personal computers, mobile computers and/or other mobile devices, and other hosts.

The computer readable media 302 includes volatile media, nonvolatile media, removable media, non-removable media, and/or another available medium. By way of example and not limitation, non-transitory computer readable medium comprises computer storage media, such as non-transient storage memory, volatile media, nonvolatile media, removable media, and/or non-removable media implemented in a method or technology for storage of information, such as computer readable instructions, data structures, program modules, or other data.

According to one aspect, the log management application computing system 102 also provides the user interface 120, such as a graphical user interface (GUI) or a command line interface (CLI), which is displayed on a display 308, such as a computer monitor, for displaying data. The log management application computing system 102 also includes an input device 310, such as a keyboard or a pointing device (e.g., a mouse, trackball, pen, or touch screen) to enter data into or interact with the user interface 120. According to one aspect, the log management application 104 includes instructions or modules that are executable by the processing system 304 as will be described in detail herein below.

Figure 4A:
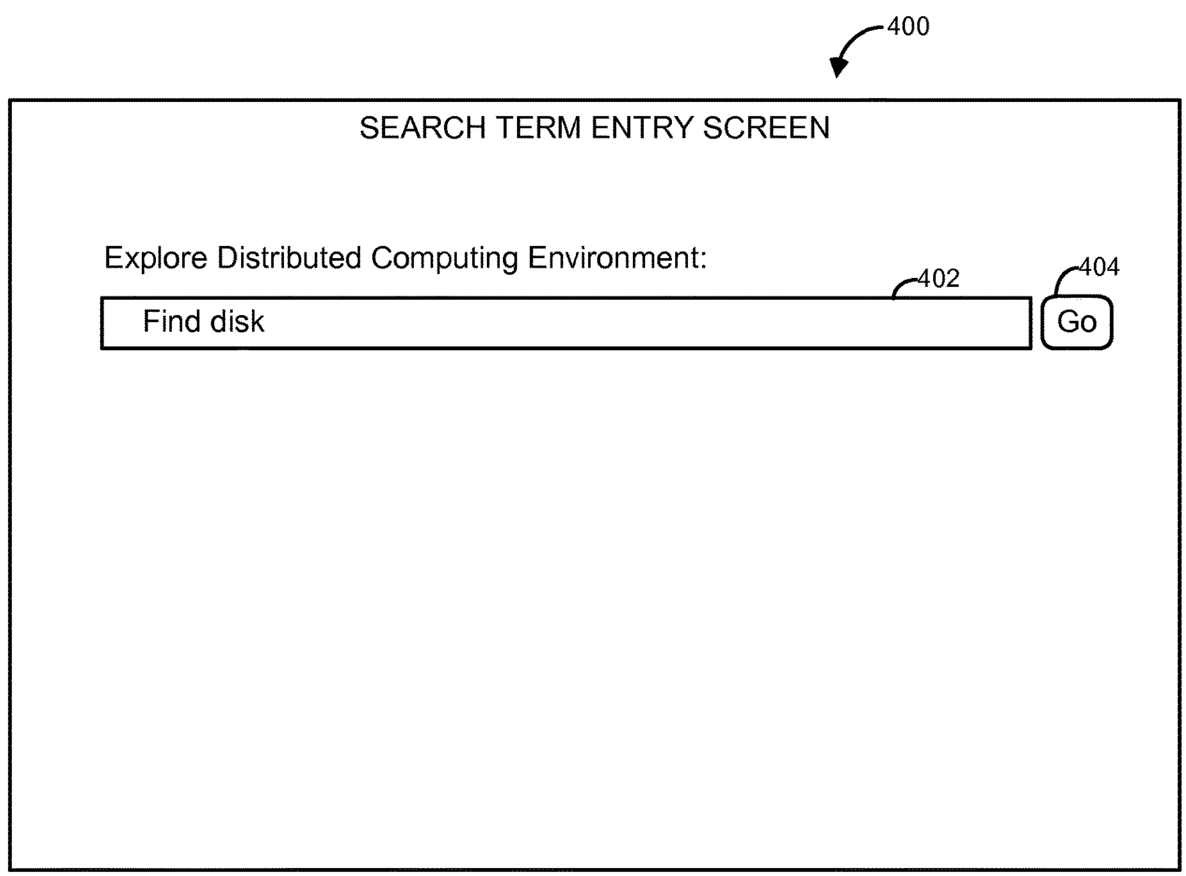
FIGS. 4A through 4C illustrate example screenshots that may be displayed by the log management application for receiving user input for searching for certain element records and displaying log messages associated with those element records on a display.
Figure 4B:
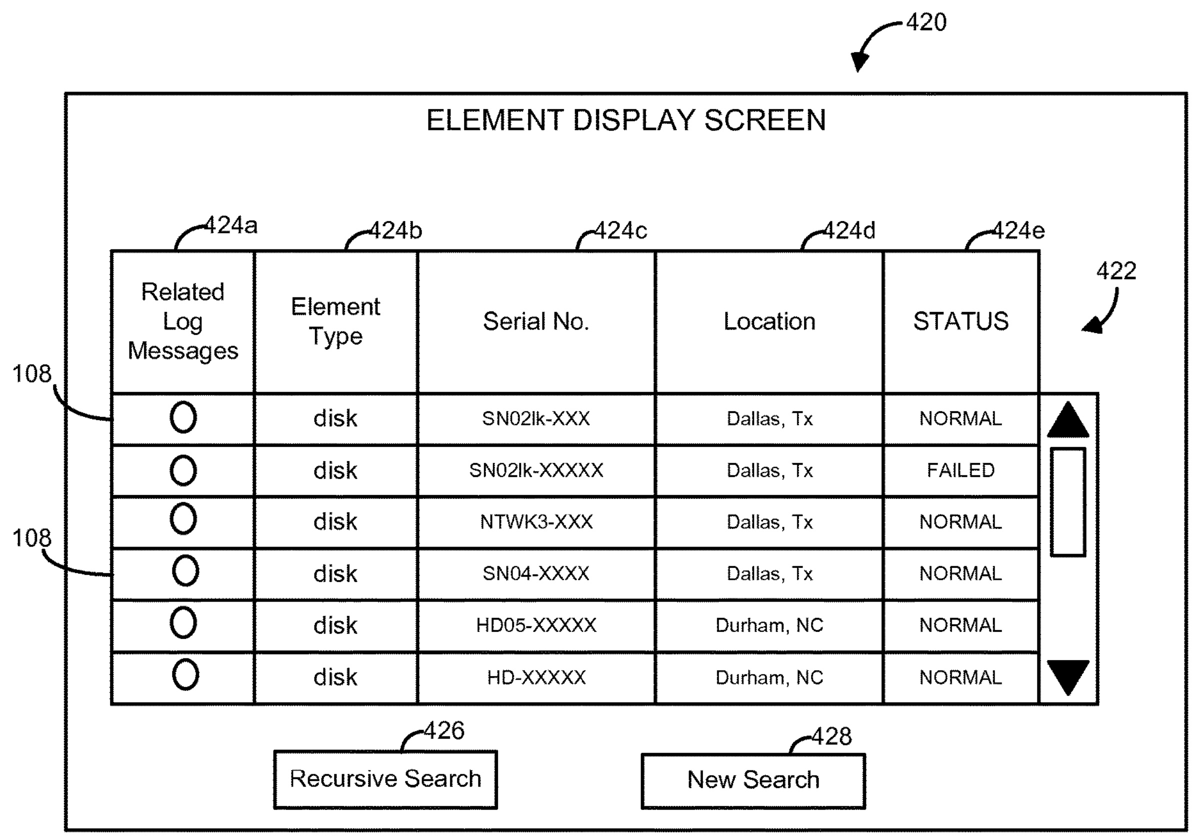
Figure 4C:
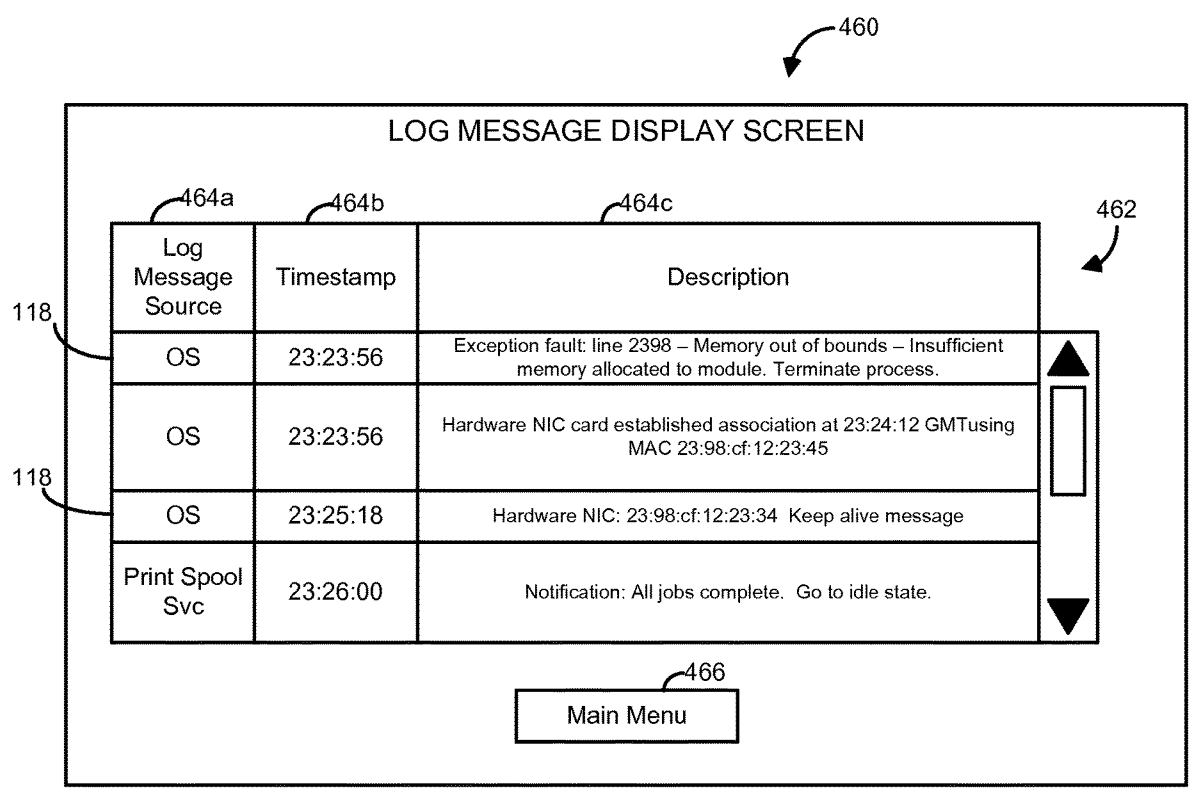

A user interface module 312 generates the user interface 120 to facilitate receipt of input data and/or output data from or to a user. The user interface module 312 may display information to, and receive user information from the user in any suitable form, such as via a graphical user interface (GUI) or a command line interface (CLI). In one embodiment, the user interface module 312 may display an entry field for receiving one or more search terms from the user as shown in FIG. 4A, and one or more other screens for displaying a response the entered search terms such as shown in FIGS. 4B through 4C. Nevertheless, other embodiments contemplate that the user interface module 312 may display any type and number of input fields for receiving user input and displaying responses to the user input. For example, the user interface module 312 may display multiple entry fields to receive multiple search terms from the user along with one or more other entry fields for receiving user input on how the fields are to be combined, such as logic for combining multiple search terms using one or more Boolean operators.

A distributed computing environment management system interface module 314 provides an interface to the distributed computing environment management system 128 for transmitting and receiving information about the distributed computing environment 114, and/or other information associated with operation of the system. For example, the distributed computing environment management system interface module 314 may communicate with the distributed computing environment management system 128 to receive information about each element 112 in the distributed computing environment 114 to be used for generating the element records 110 that are stored in the element database 108. The information may include identification information that may be used to query the element directly to receive parametric information that may be stored in the element records, or alternatively; the information may include some, most, or all parametric information that may be stored in the element records.

An element discovery module 316 performs a discovery process to obtain information associated with each element 112 in the distributed computing environment 114 and store the obtained element information element records 110 in the element database 108. For example, the element discovery module 314 may communicate with one or more element managers configured on each computing node 130 to obtain the element information. Examples of element managers that may be implemented with embodiments of the present disclosure include a Cisco Unified Computing System (UCS) manager provided by Cisco Systems, Inc., of San Jose, Calif., and a VMware Virtual Center provided by VMware Corporation, of Palo Alto, Calif. For another example, the element discovery module 314 may communicate directly with each element 112, such as by issuing broadcast messages requesting that each element 112 respond with identifying information indicating their presence, type, and/or any related parametric information.

In one embodiment, the element discovery module 314 may perform the discovery process on an ongoing, periodic basis so that the element records 110 may be maintained in an up-to-date condition. For example, the element discovery module 314 may poll one or more element managers to determine whether any elements 112 have been added, deleted, and/or modified, and if so, perform a discovery process with those elements 112 and update their information in the element records 110. As another example, the element managers may be configured to automatically notify the element discovery module 314 whenever an element 112 is added, deleted, and/or modified such that the element discovery module 314 is triggered to perform a discovery process on those elements 112.

A search term processing module 318 processes search terms 122 obtained from the user interface module 312 to manage the retrieval of element records 110 and their associated log messages 118 to the user interface 312. For example, upon receipt of one or more search terms 122 from the user interface module 312, the search term processing module 318 may query the element database 108 to obtain relevant element records 110 that match those search terms 122, and any log messages 118 that are associated with those matched element records 110. Thereafter, the search term processing module 318 may communicate with the user interface 120 for displaying the element records 110 and their associated log messages 118 on the user interface 120. In one embodiment, the search term processing module 318 communicates with a commercial-off-the-shelf (COTS) search engine (e.g., the Elasticsearch™ search engine) to query the element database 108, and receive response to those queries. In other embodiments, the search term processing module 318 may communicate directly with the element database 108 to manage the element records 110 and/or receive element records 110.

An element database management module 320 manages various functions of the element database, such as formatting information about each element to generate the element records 110 that are stored in the element database 108, updating information in each element record 110, deleting obsolete element records 110, and the like. In one embodiment, the database management module 320 includes an ElasticSearch™ search engine that creates and manages element records 110 using a schema-free JSON format, and has a RESTful interface for communication over a network. Nevertheless, the database management module 320 may utilize any suitable type of search engine without departing from the spirit and scope of the present disclosure.

A log message database management module 322 manages retrieval of log messages from the elements 112, and storing of the log messages 118 in the log message database 116. In one embodiment, the log message database management module 322 obtains the log messages 118 from the elements at regular, ongoing intervals. For example, the log message database management module 322 may, at ongoing (e.g., periodic) intervals, access each element record 110 in the element database 108, poll each element 112 associated with that element record 110, and retrieve any log messages from one or more log message sources 126 of that element 112. In another embodiment, the log message database management module 322 may communicate with an agent installed on, and executed by its associated element 112 to receive the log messages 118 as they are created by its respective element 112. For example, an agent may be continually executed on a particular element 112 that continually monitors one or more components of its element for any events, such as an exception event generated by one or more applications executed on the element, or a triggering event generated in response to a threshold value being exceeded. When such an event is detected by the agent, it may generate a log message 118 that is subsequently transmitted to the log message management module 322 for storage in the log message database 116.

In one embodiment, the log message database management module 322 appends or otherwise modifies certain received log messages 118 to include additional content before storing the log message 118 in the log message database 116. For example, the log message database management module 322 may append a timestamp from a standardized timing source to the log message 118 so that the log message 118 may include timing information from a standardized time clock, such as a common time clock that is used by most or all of the elements 112 of the distributed computing environment 114. For another example, the log message database management module 322 may append a unique identifier, such as an Internet protocol (IP) address of the element 112, and/or a worldwide name (WWN) moniker, to the log message 118 prior to storing the log message 118 in the log message database 116. In this manner, the log message 118 may be easily associated with its respective element record 110 in some embodiments.

In one embodiment, the log message database management module 322 may manage the log message database 116 to regulate its size by removing older log messages 118 from the log message database 116. For example, the log message database management module 322 may ensure that a certain quantity of log messages 118 are stored for each element 112 by removing the oldest log message 118 as each new log message 118 is added in a first-in-first-out (FIFO) fashion. As another example, the log message database management module 322 may erase most or all log messages 118 in the log message database 116 at a specified time of the day, such as at midnight, so that all log messages 118 include only those that have been generated during the current day. As yet another example, the log message database management module 322 may be responsive to user input via the user interface 312 to erase some, most, or all of the log messages 118 stored in the log message database 116.

An element record/log message correlation module 324 correlates log messages 118 stored in the log message database 116 with their respective element records 110. For example, when the search term processing module 318 requests the log messages 118 associated with a particular element record 110, the element record/log message correlation module 324 identifies those log messages 118 stored in the log message database 116 that are associated with the requested element record 110 and returns those log messages to the search term processing module 318 so that they may be forwarded to the user interface 312 for view by the user.

In one embodiment, the element record/log message correlation module 324 compares any identifying information included in the element record 110 (e.g., UID) with corresponding identifying information included in each log message 118 to correlate the log messages 118 with their associated element record 110. In another embodiment, the element record/log message correlation module 324 accesses the element record/log message correlation records 134 stored in the data source 106 to correlate the log messages 118 with their respective element records 110 requested by the search term processing module 318. For example, the element record/log message correlation record 134 may include identification information of an element record 110 stored in a first format and identification information of its corresponding log messages 118 stored in a second format. When the element record/log message correlation module 324 needs to access the log messages associated with that element record 110, it obtains an element record/log message correlation record 134 associated with that element record 110, identifies the identifying information in the second format, and obtains the associated log messages 118 using the second format.

It should be appreciated that the modules described herein are provided only as examples, and that the log management application 104 may have different modules, additional modules, or fewer modules than those described herein. For example, one or more modules as described in FIG. 3 may be combined into a single module. As another example, certain modules described herein may be encoded on, and executed on other computing devices, such as on one of the hosts 202 of a converged infrastructure 200 as described above with reference to FIGS. 2A and 2B.

FIGS. 4A through 4C illustrate example screenshots that may be displayed by the application 104 for receiving one or more search terms from a user interface, obtaining element records 110 that match the received search terms 122, and outputting the matched element records 110 along with their respective log messages 118 according to one embodiment of the present disclosure. In general, FIG. 4A is a search term entry screen 400 that may be used for receiving one or more search terms from the user, FIG. 4B is an element display screen 420 for displaying information about the element records 108 that match the search terms entered in the search term entry screen 400 of FIG. 4A, and FIG. 4C is a log message display screen 460 that displays log messages 118 associated with one of the element records 110 displayed in the element display screen of FIG. 4B.

Referring initially to FIG. 4A, the search term entry screen 400 includes an entry field 402 for entering one or more search terms, and a 'go' button 404 for submitting the entered search terms to the application 104. The entry field 402 supports entry of a single search term or the entry of multiple search terms that may be separated by one or more Boolean operators, such as 'AND', 'OR', 'ANDNOT', 'ORNOT', and the like. Additionally the entry field 402 supports entry of a phrase including a structured sequence of multiple words, such as "compute array devices, "Atlanta, Ga.", "ACME, Incorporated", and the like. Once the search term(s) have been entered, the 'go' button 404 may be selected for submitting the search term(s) to the application 104.

Once the search term(s) have been submitted, the element display screen 420 (FIG. 4B) may be displayed that includes those element records 108 matching the terms inputted in the search term entry screen 400 by the application 104. The element display screen 420 includes an element record list 422 in which the element records 108 are arranged in rows and various parameters associated with each element record 108 are arranged in columns. The element record list 422 includes a 'related log messages' column 424*a*, an 'element type' column 424*b*, a 'serial number' column 424*c*, a 'location' column 424*d*, and a 'status' column 424*e*. The 'element type' column 424*b* indicates the element type of its respective element record 108. The 'serial number' column 424*c* indicates a serial number associated with each element record 108 and is essentially a unique identifier associated with its respective element record 108. The 'location' column 424*d* indicates the location that the element associated with the element record 108 is located at, while the 'status' column 424*e* indicates whether its respective element 112 is in an normal or failed state. Although the example element record list 422 shown herein has an 'element type' column 424*b*, a 'serial number' column 424*c*, a 'location' column 424*d*, and a 'status' column 424*e*, other example element record lists may include additional, fewer, or different types of parameters than shown above.

The element display screen 420 includes a 'recursive search' button 426 that when selected by the user, causes the application 104 to again display the search term entry screen 400 for receiving one or more additional search terms from the user. Use of the 'recursive search' button 426 may be useful for cases in which the user desires to further filter the element records 108 to obtain a relatively more concise grouping of certain element records 108. For example, the user may wish to obtain a certain type of element records 108 for all disks at one particular location. However, an initial search for the desired type of element records 108 (e.g., disks) shows the disk element records 108 to all disks regardless of location. Therefore, the user may select the 'recursive search' button 426 to enter another search term including the desired location (e.g., Dallas, Tex.) such that another search may be performed such that only the disk element records 108 associated with disk elements located at Dallas, Tex. are retrieved and displayed.

The element display screen 420 also includes a 'new search' button 428 that when selected by user, causes the application 104 to again display the search term entry screen 400 for receiving entry of other search terms from the user. The application 104 performs actions in response to the 'new search' button 428 that are different from those performed in response to the 'recursive search' button 426. Whereas, selection of the 'recursive search' button 426 causes the application 104 to cumulatively add filtering provided by a previous entry of search terms, the application 104 cancels the search terms obtained via any previous entry in response to the 'new search' button 428. By use of the 'new search' button 428, the user may be able to initiate a new search for other element records 108 when a previous search for a previous group of element records 108 has been completed.

If the user desires to view any log messages 118 associated with a particular element record 110, the 'related log messages' column 424*a* of the element record list 422 may be used. The 'related log messages' column 424*a* includes radio buttons for each element record 108 such that, when selected by the user, causes the application 104 to generate a log message display screen 460 as shown in FIG. 4C. In general, the log messages display screen 460 displays any log messages 118 stored in the log message database 116 that are associated with the element record 110 selected by the user.

The log message display screen 460 includes a log message list 462 in which the log messages 118 are arranged in rows and various parameters associated with each log message 118 are arranged in columns. For example, the log message list 462 includes a 'log message source' column 464*a*, a 'timestamp' column 464*b*, and a 'description' column 464*c*. The 'log message source' column 464*a* indicates the log message source 126 that generated the log message 118. Examples of log message sources 126 may include an operating system (OS) of the element 112, an application executed on the element 112, and/or the BIOS or firmware of the element 112. The 'timestamp' column 464*b* indicates a timestamp value included in the log message 118. For example, the timestamp value may be a value assigned by its log message source, or it may be assigned by the log message database management module 322 using a time clock common to most or all of the elements 112. The 'description' column 464*c* includes information obtained from the native log message 118, such as alpha-numeric text information included as part of a syslog message. Although the example element log message list 462 shown herein has an 'log message source' column 464*a*, a 'timestamp' column 464*b*, and a 'description' column 464*c*, other example log message lists may include additional, fewer, or different types of parameters than shown above.

The log message display screen 460 also includes a 'main menu' button 466 that when selected by the user, causes the application 104 to again generate the element display screen 640 so that the user may select another radio button in the 'related log messages' column 424*a* for viewing the log messages 118 associated with another element record 110, or alternatively, performing a new search for other element records 110 and their associated log messages 118.

Although FIGS. 4A through 4C illustrate example screens that may be used for receiving user input for selectively display the log messages 118 associated with certain element records 110, the application 104 may display additional, fewer, or different entry screens without departing from the spirit and scope of the present disclosure. For example, the application 104 may display other screens for entering and/or displaying the element records 108 and their associated user-defined data 116 in any suitable manner.

Figure 5:
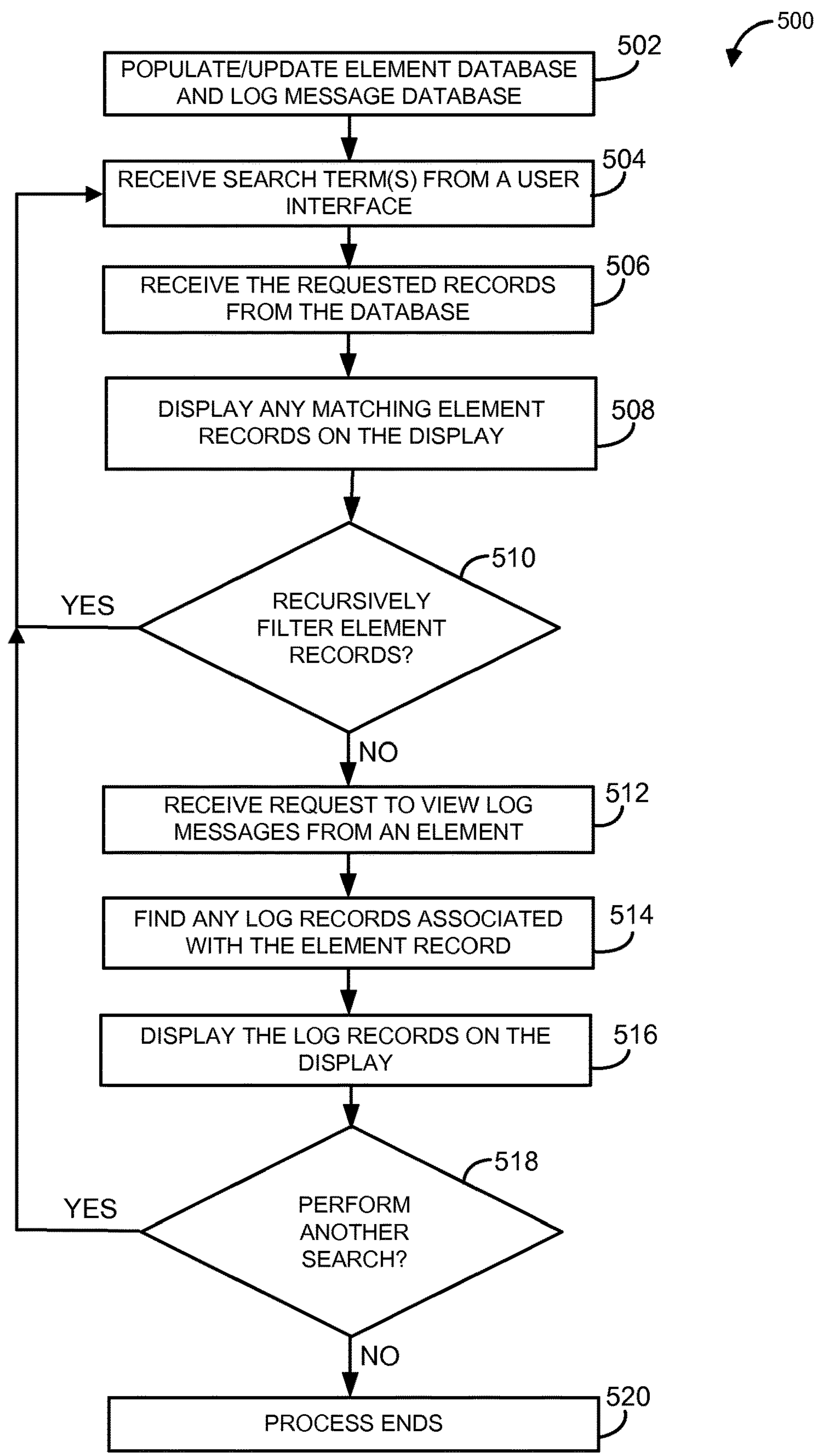
FIG. 5 illustrates an example process that is performed by the log management system according to one embodiment of the present disclosure.

FIG. 5 illustrates an example process 500 that is performed by the application 104 or finding and displaying log messages 118 associated with certain element records according to one embodiment of the present disclosure.

In step 502, the application 104 populates and/or updates the data source 106 with element records 108 and log message messages 116 associated with the elements 112 of a distributed computing environment 114 and the log messages 118 generated by the element records 112, respectively. For example, the application 104 may populate a new data store that has not previously been populated with the element records 108, or if the data store has been previously populated, the application 104 may update an existing data store with the element records 108 on an ongoing (e.g., periodic) basis such that the parameters and their respective reflect the most recent status of each element 112 of the distributed computing environment 114. In one embodiment, the application 104 communicates directly with each element 112 to receive its parametric values. In another embodiment, the application 104 communicates indirectly with each element 112 using an element manager associated with each element 112 to obtain its parametric values.

In one embodiment, the application 104 populates the log message database 116 with log messages 118 as they are generated using an agent executed on the element and in communication with the log message source 126 such that, whenever the log message source 126 generates a log message 118, it is immediately transmitted to the application 104 for storage in the log message database 116.

In step 504, the application 104 receives one or more search terms from the user interface 118. If more than one search term are received, it may apply one or more Boolean operators (e.g., OR, AND, ANDNOT, ORNOT, etc.) between each search term.

In step 506, the application 104 searches the data store 106 for any element records 108 that match the one or more search terms. In one embodiment, the search terms may be applied against any previously entered user-defined data 116 assigned to any of the element records 108 in the data store 106. That is, the application 104 compares any entered search terms with the user-defined data 116 stored in the element records 108 and obtains those records that match the search terms. Thereafter, the application 104 displays the matched element records 108 on the user interface 118 in step 508.

In step 510, the application 104 determines whether the currently obtained element records 108 are to be further filtered using one or more additional search terms. For example, the application 104 may receive user input via the 'recursive search' button 428 on the query response screen 420 that instructs the application 104 to receive one or more additional search term(s). If the application 104 receives instructions to recursively filter the identified element records 108, processing continues at step 502 to receive additional search terms from the user. However, if the application 104 determines that no recursive filtering of the obtained element records 108 are to be provided, processing continues at step 512.

In step 512, the application 104 receives a request to view the log messages 118 associated with a particular element record 110 selected by the user. For example, the application 104 may receive selection of a radio button selected in the 'related log messages' column 424*a* of the element display list 422 of FIG. 4B. In response, the application 104 may find any log messages 118 in the log message database 118 that correspond to the element record 110 selected by the user in step 514. In one embodiment, the application 104 may find the log messages 118 by accessing the element record/log message correlation files 134 to identify any log messages 118 corresponding to the selected element record 110. In another embodiment, the application 104 may find the log messages 118 by accessing the log messages 118 directly by associating information in the log messages 118 with that provided in the selected element record 110. Thereafter, the application 104 displays any log messages 118 correlated with the selected element record 110 on the display 308 at step 516.

In step 518, the application 104 determines whether another search is to be performed. For example, the application 104 may receive user input via the 'new search' button 428 on the element display screen 420 that instructs the application 104 to clear its search term buffer for constructing a new group of element records 108. If the application 104 receives instructions to perform another search, processing continues at step 502 to receive new search terms from the user. However, if the application 104 determines that no additional searches are to be performed, processing continues at step 520 in which the process ends.

Although FIG. 5 describes one example of a process that may be performed by the system for finding and displaying log messages 118 associated with certain element records 110, the features of the disclosed process may be embodied in other specific forms without deviating from the spirit and scope of the present disclosure. For example, the system 100 may perform additional, fewer, or different operations than those operations as described in the present example. As another example, the steps of the process described herein may be performed by a computing system other than the computing system 102, which may be, for example, one of the virtual objects executed on the virtual computing environment.

The description above includes example systems, methods, techniques, instruction sequences, and/or computer program products that embody techniques of the present disclosure. However, it is understood that the described disclosure may be practiced without these specific details.

In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form (e.g., software, processing application) readable by a machine (e.g., a computer). The machine-readable medium may include, but is not limited to, magnetic storage medium, optical storage medium (e.g., CD-ROM); magneto-optical storage medium, read only memory (ROM); random access memory (RAM); erasable programmable memory (e.g., EPROM and EEPROM); flash memory; or other types of medium suitable for storing electronic instructions.

Figure 6:
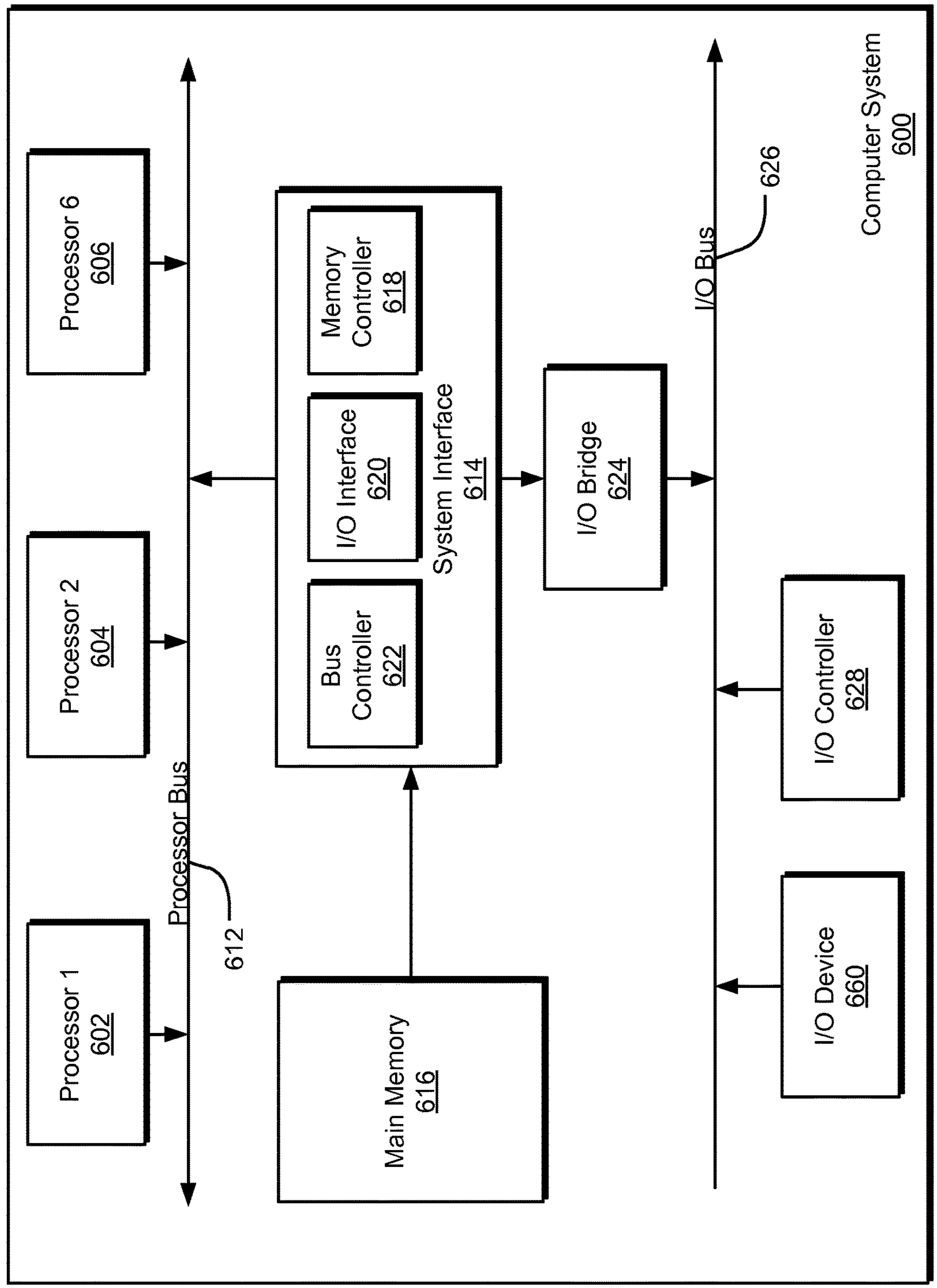
FIG. 6 illustrates an example computer system according to one embodiment of the present disclosure.

For example, FIG. 6 is a block diagram illustrating an example of a host or computer system 600 which may be used in implementing the embodiments of the present disclosure. The computer system (system) includes one or more processors 602-606. Processors 602-606 may include one or more internal levels of cache (not shown) and a bus controller or bus interface unit to direct interaction with the processor bus 612. Processor bus 612, also known as the host bus or the front side bus, may be used to couple the processors 602-606 with the system interface 614. System interface 614 may be connected to the processor bus 612 to interface other components of the system 600 with the processor bus 612. For example, system interface 614 may include a memory controller 613 for interfacing a main memory 616 with the processor bus 612. The main memory 616 typically includes one or more memory cards and a control circuit (not shown). System interface 614 may also include an input/output (I/O) interface 620 to interface one or more I/O bridges or I/O devices with the processor bus 612. One or more I/O controllers and/or I/O devices may be connected with the I/O bus 626, such as I/O controller 628 and I/O device 630, as illustrated.

I/O device 630 may also include an input device (not shown), such as an alphanumeric input device, including alphanumeric and other keys for communicating information and/or command selections to the processors 602-606. Another type of user input device includes cursor control, such as a mouse, a trackball, or cursor direction keys for communicating direction information and command selections to the processors 602-606 and for controlling cursor movement on the display device.

System 600 may include a dynamic storage device, referred to as main memory 616, or a random access memory (RAM) or other computer-readable devices coupled to the processor bus 612 for storing information and instructions to be executed by the processors 602-606. Main memory 616 also may be used for storing temporary variables or other intermediate information during execution of instructions by the processors 602-606. System 600 may include a read only memory (ROM) and/or other static storage device coupled to the processor bus 612 for storing static information and instructions for the processors 602-606. The system set forth in FIG. 6 is but one possible example of a computer system that may employ or be configured in accordance with aspects of the present disclosure.

According to one embodiment, the above techniques may be performed by computer system 600 in response to processor 604 executing one or more sequences of one or more instructions contained in main memory 616. These instructions may be read into main memory 616 from another machine-readable medium, such as a storage device. Execution of the sequences of instructions contained in main memory 616 may cause processors 602-606 to perform the process steps described herein. In alternative embodiments, circuitry may be used in place of or in combination with the software instructions. Thus, embodiments of the present disclosure may include both hardware and software components.

A machine readable medium includes any mechanism for storing or transmitting information in a form (e.g., software, processing application) readable by a machine (e.g., a computer). Such media may take the form of, but is not limited to, non-volatile media and volatile media. Non-volatile media includes optical or magnetic disks. Volatile media includes dynamic memory, such as main memory 616. Common forms of machine-readable medium may include, but is not limited to, magnetic storage medium, optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions.

Embodiments of the present disclosure include various operations or steps, which are described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software and/or firmware.

It is believed that the present disclosure and many of its attendant advantages will be understood by the foregoing description, and it will be apparent that various changes may be made in the form, construction, and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A log management method comprising:

receiving, using instructions stored in a non-transitory, computer-readable medium and executed on at least one processor, one or more search terms from a graphical user interface of a computer system, the one or more search terms containing parameters associated with an operation or configuration of a plurality of elements of a distributed computing environment;

identifying, from a plurality of element records stored in an element database in a first format and each associated with a corresponding element of the plurality of elements of the distributed computing environment, one or more element records that match the parameters contained in the one or more search terms using a processor that performs an ongoing periodic element discovery process to generate new element records when one or more elements of the distributed computing environment are added, deleted, or modified;

modifying, prior to storage in a log message database, a plurality of log messages to append unique identifying information in a second format different from the first format, the unique identifying information comprising a Worldwide Name (WWN) corresponding to an element of the plurality of elements of the distributed computing environment from which the plurality of log messages is received at the log message database;

for each matched element record, determining a subset of log messages, out of the plurality of log messages stored in the log message database, each of the subset of log messages in the second format, that pertain to the element associated with the matched element record, wherein determining the subset of log messages comprises accessing a correlation record for the element associated with the matched element record, the correlation record stored separate from both the log message database and the element database and comprising a first identification, in the first format, of the matched element record as correlated to a second identification, in the second format, of the subset of log messages;

obtaining, based on the correlation record, the subset of log messages associated with the matched element records; and facilitating, using the instructions, a display of one or more identified element records and their associated log messages on a display.

2. The log management method of claim 1, further comprising:

obtaining the subset of log messages associated with the matched element records further based on the unique identifying information.

3. The log management method of claim 1, further comprising:

modifying the plurality of log messages before they are stored in the log message database to include timing information obtained from a common timing source.

4. The log management method of claim 1, further comprising issuing a request to a database search engine that stores the plurality of log messages without any specified schema in the log message database.

5. The log management method of claim 1, wherein the plurality of log messages are stored in the log message database as Javascript object notation (JSON) documents.

6. The log management method of claim 1, further comprising obtaining the plurality of log messages from an agent executed on the element, the agent communicating with a log message source of the element to receive one or more log messages from the log message source and transmit the one or more log messages to the computing system.

7. A log management system comprising:

a computing system in communication with a distributed computing environment comprising a plurality of elements, an element database that stores, in a first format, element records each representing a corresponding element of the plurality of elements of the distributed computing environment, and a log message database that stores, in a second format different than the first format, log messages associated with the element records, the computing system comprising at least one hardware processor and at least one memory to store instructions that are configured to, when executed by the at least one hardware processor to:

receive one or more search terms from a graphical user interface, the one or more search terms comprising parameters associated with an operation or configuration of the plurality of elements;

identify one or more of the element records that match the parameters of the one or more search terms, using the at least one hardware processor to perform an ongoing periodic element discovery process to generate new element records when one or more elements of the distributed computing environment are added, deleted, or modified;

modifying, prior to storage in the log message database, a plurality of log messages to append unique identifying information in the second format, the unique identifying information comprising a Worldwide Name (WWN) corresponding to an element of the plurality of elements of the distributed computing environment from which the plurality of log messages is received at the log message database;

for each matched element record, determine a subset of the log messages that pertain to an element associated with the matched element record, wherein determining the subset of the log messages comprises accessing a correlation record for the element associated with the matched element record, the correlation record stored separate from both the log message database and the element database and comprising a first identification, in the first format, of the matched element record as correlated to a second identification, in the second format, of the subset of the log messages;

obtaining, based on the correlation record, the subset of the log messages associated with the matched element records; and facilitate a display of the one or more identified element records and their associated log messages on a display.

8. The log management system of claim 7, wherein the instructions are executed to:

obtain the subset of the log messages associated with the matched element records further based on the unique identifying information.

9. The log management system of claim 7, wherein the instructions are executed to:

modify the log messages before they are stored in the log message database to include timing information obtained from a common timing source.

10. The log management system of claim 7, wherein the instructions are further configured to issue a request to a database search engine that stores the log messages without any specified schema in the database.

11. The log management system of claim 10, wherein the log messages are stored in the database as Javascript object notation (JSON) documents.

12. The log management system of claim 7, wherein the instructions are executed to obtain the log messages from an agent executed on the element, the agent communicating with a log message source of the element to receive log messages from the log message source and transmit the log messages to the computing system.

13. A non-transitory computer readable medium having code implemented such that when executed by at least one hardware processor, the at least one hardware processor is configured to perform at least the following:

receiving one or more search terms from a graphical user interface, the one or more search terms comprising parameters associated with an operation or configuration of a plurality of elements of a distributed computing environment;

identifying, from a plurality of element records stored in an element database in a first format, each of the plurality of element records associated with a corresponding element of the plurality of elements of the distributed computing environment, one or more of element records that match the parameters of the one or more search terms, using a processor that performs an ongoing periodic element discovery process to generate new element records when one or more elements of the distributed computing environment are added, deleted, or modified;

modifying, prior to storage in a log message database, a plurality of log messages to append unique identifying information in a second format different from the first format, the unique identifying information comprising a Worldwide Name (WWN) corresponding to an element of the plurality of elements of the distributed computing environment from which the plurality of log messages is received at the log message database;

for each matched element record, determining a subset of log messages, out of the plurality of log messages stored in the log message database, each of the subset of log messages in the second format, that pertain to the element associated with the matched element record, wherein determining the subset of the log messages comprises accessing a correlation record for the element associated with the matched element record, the correlation record stored separate from both the log message database and the element database and comprising a first identification, in the first format, of the matched element record to a second identification, in the second format, of the subset of the log messages;

obtaining, based on the correlation record, the subset of the log messages associated with the matched element records; and facilitating a display of the one or more identified element records and their associated log messages on a display.

14. The non-transitory computer readable medium of claim 13, the code when executed by the hardware processor further operable to perform:

obtaining the subset of the plurality of log messages associated with the matched element records further based on the unique identifying information.

15. The non-transitory computer readable medium of claim 13, the code when executed by the hardware processor further operable to perform modifying the plurality of log messages before they are stored in the log message database to include timing information obtained from a common timing source.

16. The non-transitory computer readable medium of claim 13, the code when executed by the hardware processor further operable to perform issuing a request to a database search engine that stores the plurality of log messages without any specified schema in the database.

17. The non-transitory computer readable medium of claim 13, the code when executed by the hardware processor further operable to perform obtaining the plurality of log messages from an agent executed on the element, the agent communicating with a log message source of the element to receive log messages from the log message source and transmit the log messages to the graphical user interface.

* * * * *